J. H. STEELE.
MACHINE FOR THE MANUFACTURE OF GLASS BOTTLES, JARS, AND THE LIKE.
APPLICATION FILED MAR. 29, 1916.

1,213,291.

Patented Jan. 23, 1917.
3 SHEETS—SHEET 1.

Inventor.
James Henderson Steele.
Per Ferdinand Bosshardt
Attorney.

J. H. STEELE.
MACHINE FOR THE MANUFACTURE OF GLASS BOTTLES, JARS, AND THE LIKE.
APPLICATION FILED MAR. 29, 1916.
1,213,291.
Patented Jan. 23, 1917.
3 SHEETS—SHEET 2.
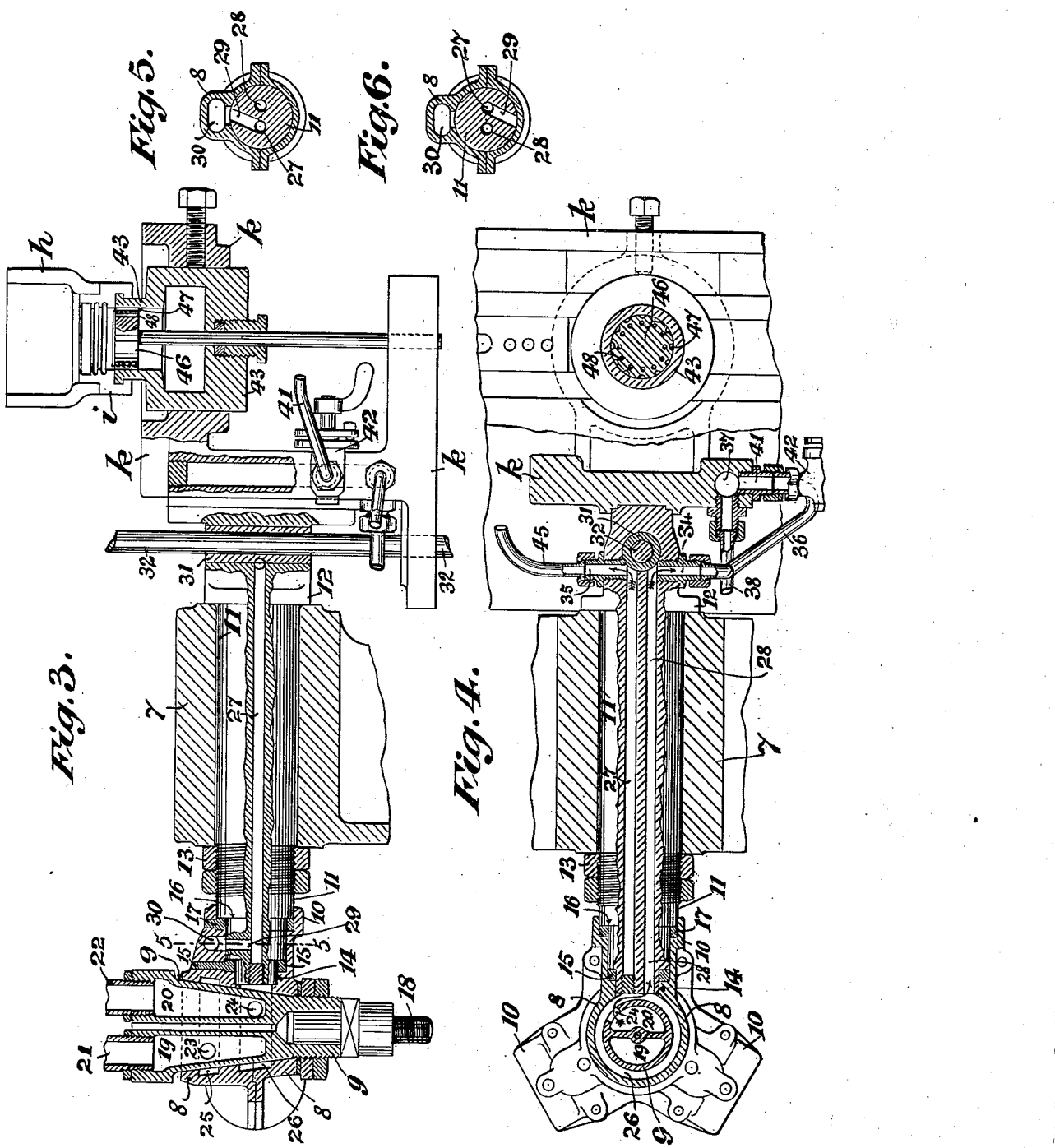
Inventor
James Henderson Steele.
Per Ferdinand Bosshardt
Attorney.

J. H. STEELE.
MACHINE FOR THE MANUFACTURE OF GLASS BOTTLES, JARS, AND THE LIKE.
APPLICATION FILED MAR. 29, 1916.

1,213,291.  Patented Jan. 23, 1917.

Inventor.
James Henderson Steele.
Per Ferdinand Bosshardt.
Attorney.

UNITED STATES PATENT OFFICE.

JAMES HENDERSON STEELE, OF PENDLETON, ENGLAND.

MACHINE FOR THE MANUFACTURE OF GLASS BOTTLES, JARS, AND THE LIKE.

1,213,291. Specification of Letters Patent. Patented Jan. 23, 1917.

Application filed March 29, 1916. Serial No. 87,477.

*To all whom it may concern:*

Be it known that I, JAMES HENDERSON STEELE, a subject of the King of Great Britain, residing at Pendleton, in the county of Lancaster, England, have invented new and useful Improvements in Machines for the Manufacture of Glass Bottles, Jars, and the like, of which the following is a specification.

This invention relates to improvements in that type of machines for the manufacture of glass bottles, jars and the like which generally comprises a pillar and an intermittently rotatable sleeve thereon carrying at its upper end bearings in each of which a turnover-bracket is mounted, a number of parison and ring or neck molds carried by the said turnover-brackets and a corresponding number of finishing molds and in which the said parison mold is opened and closed by a compressed air operated piston and the compressed air used for blowing is conveyed into the parison through the plunger located in the nozzle carried by the ring or neck mold and means are provided for creating a vacuum in the interior of the ring or neck mold to insure the parison conforming with the interior thereof.

The object of my invention is to provide improved means for conveying the compressed air from its supply to the said piston and ring or neck mold and for establishing and cutting off communication between the vacuum source and the interior of the said ring or neck mold, whereby the efficiency of the machine is greatly increased.

I attain this object by the mechanism illustrated in the accompanying three sheets of drawings, in which—

Figure 1:
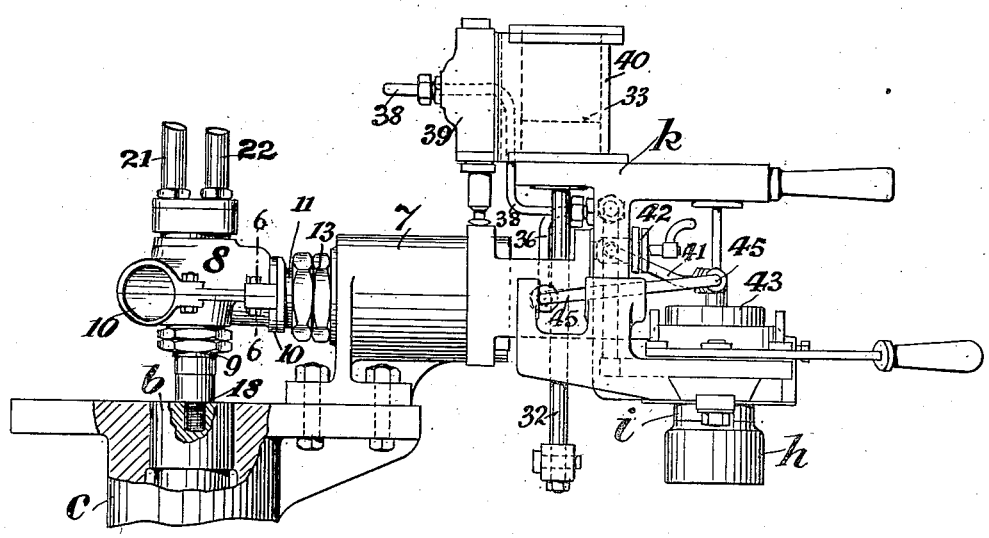
Figure 2:
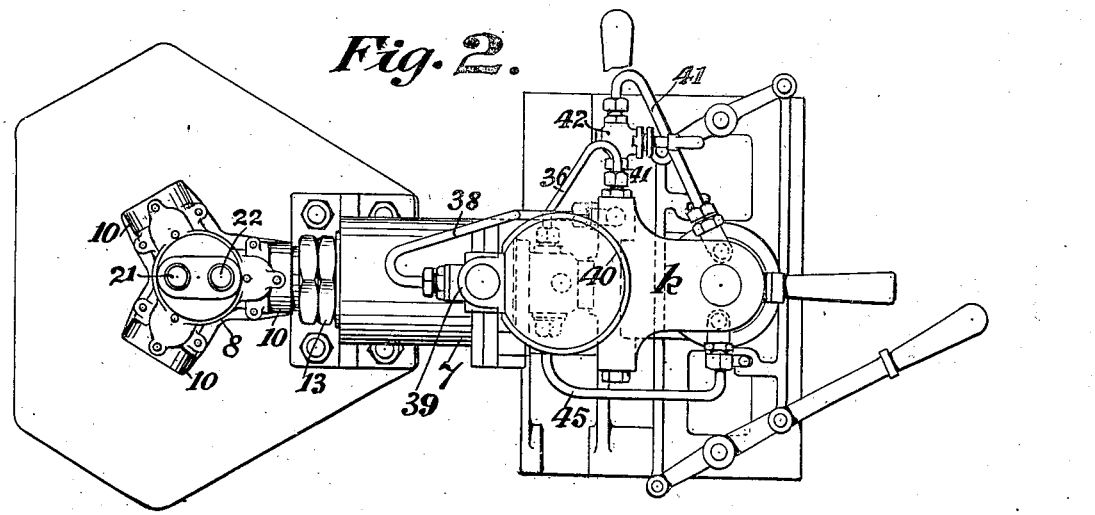
Figure 7:
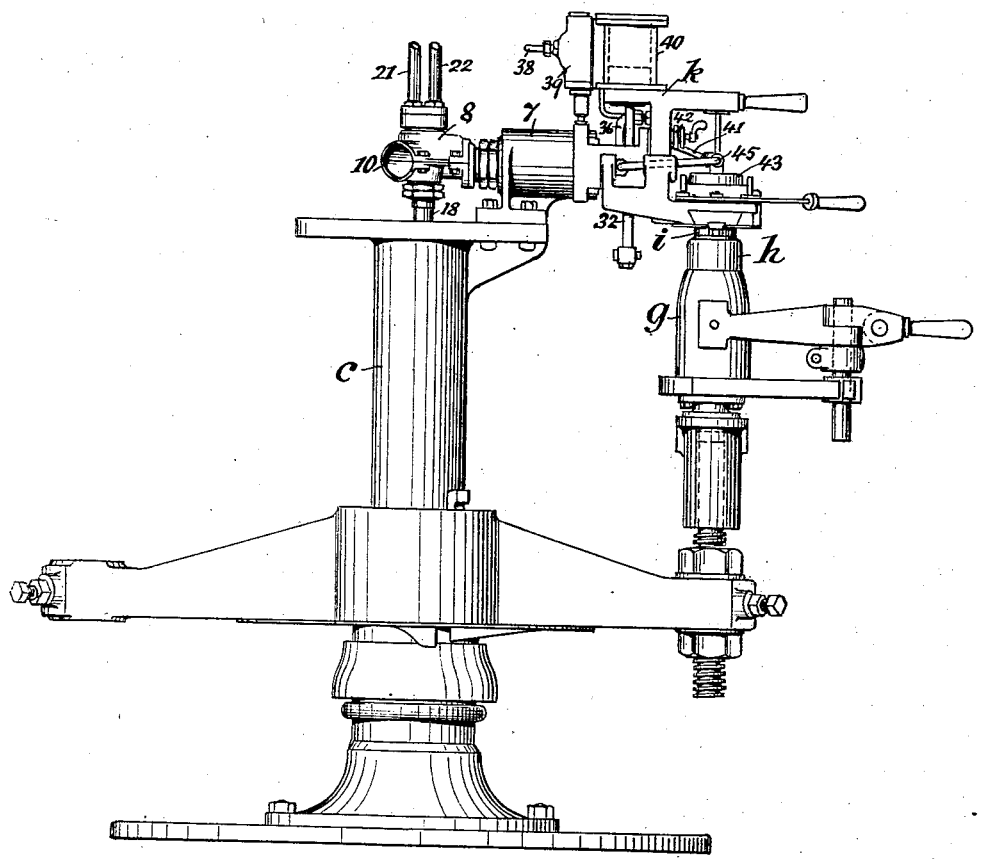

Figures 1 and 2 are respectively a side view and plan of the upper portion or head of the machine. Figs. 3 and 4 are respectively a sectional side view and sectional plan of the upper portion or head of the machine, and Figs. 5 and 6 cross sections of Figs. 1 and 3 on lines 5—5 and 6—6 respectively, Figs. 3, 4, and 5 showing the turnover-bracket in its initial and Figs. 1, 2 and 6 in its reversed or second position. Fig. 7 is an elevation on a reduced scale of a machine provided with the said improvements.

Similar letters refer to similar parts throughout the several views.

Referring to the figures generally, $b$ is the said pillar, $c$ the sleeve thereon, $k$ the turnover-bracket, 7 the bearing in which the latter is mounted, $h$ the parison mold, $i$ the ring or neck mold.

On the top of the frame, standard or pillar $b$ of the machine, I employ centrally therewith a casing 8 containing a plug 9 and having externally bosses 10 corresponding in number with and adapted to receive the rear ends of the pivots 11 of the turnover-bracket $k$, which casing and plug together with the said pivots form a valve.

Each turnover-bracket $k$ is longitudinally held in position in its bearing 7, in the present instance by forming on its front end a collar 12 and on its rear end a screw-thread, furnished with a locked nut 13 adapted to bear against the respective end of the bearing 7. In lieu of the said screw-thread and locked nut, a collar furnished with a set screw may be used.

The extreme rear end of each of the pivots 11 is formed with a neck 14 for the reception of a metal packing 15 to form a tight joint between the rear end of the pivot 11 and the boss 10 of the casing 8 into which it projects.

To provide additional security against leakage I form the rear end of the pivot 11 with a second neck 16 furnished with a packing 17 near the free end of the boss 10. In the present instance, each of the said packings is formed of white metal cast around the said neck in ring fashion through a cross aperture formed in said boss.

The valve plug 9 is arranged stationary, in the present instance, by forming or furnishing its lower end with a stud 18 screw-threaded into the top of the pillar $b$, whereas the casing 8 is rotatable on the plug 9.

The valve plug 9 is longitudinally divided into two compartments 19, 20 one of which by a pipe 21 is connected with a vacuum source and the other by a pipe 22 with a compressed air supply.

In the wall of the plug 9 near the top and bottom are respectively formed the ports 23, 24. The port 23 communicates always with the annular recess 25 and the port 24 with the annular recess 26, formed in the interior of the casing 8, the annular recess 26 being in alinement with the axis of the pivots 11.

Each turnover-bracket pivot 11 has two passages 27, 28 formed therein longitudinally side by side. The rear end of the passage 27 is plugged up and has a cross port 29 adapted to register with a port 30 formed in the casing 8 and leading to the upper annular recess 25, while the rear end of the other of the passages 28 is open and remains always in communication with the lower annular recess 26 in the casing 8. The front end of each of the passages 27, 28 is closed up by means of a bush 31 located in a hole formed diametrically in the pivot 11, through which bush the rod 32 of the compressed air operated piston 33 passes. In the front end of the pivot 11 are formed two cross ports 34, 35, one of which 34 communicates with the passage 28 in the pivot 11 and by a pipe 36 with a chamber 37 formed in the turnover-bracket $k$ and the other 35 with the passage 27 in the pivot 11. The chamber 37 is also connected by a pipe 38 with the valve box 39 of the cylinder 40 containing the compressed air operated piston 33 and by a further pipe 41 furnished with a stop tap 42, with the interior of the nozzle 43 carried by the ring or neck mold $i$. The interior of the nozzle 43 is also connected by a pipe 45 with the cross port 35 at the front end of the passage 27 in the pivot 11 of the turnover-bracket $k$ leading to the vacuum compartment 19 of the valve plug 9.

The plunger 46 employed in the nozzle 43, has as usual grooves 47 in its periphery whereby communication between the interior of the ring or neck mold $i$ and the said vacuum source is established, while through the plunger 46, holes 48 are formed for the passage of the compressed air into the parison.

When the turnover-bracket $k$ is in its initial position, that is to say, in the position in which the parison mold is being filled, see Figs. 3, 4 and 5, the cross port 29 in the rear end of the pivot 11 of the turnover-bracket $k$ is in register with the port 30 in the valve casing 8 leading to the vacuum compartment 19 in the plug 9 and the parison is thus effectually drawn against the interior of the ring or neck mold $i$ to properly conform therewith. When bringing the turnover-bracket $k$ into its reversed or second position over the finishing mold $g$, see Figs. 1, 2 and 7, the cross port 29 in the rear end of the pivot 11 is brought out of register with the port 30 in the valve casing 8 and the vacuum source thus cut off, while compressed air is admitted to the cylinder 40 containing the piston 33 which opens the parison mold $h$ after which the stop tap 42 is operated and thereby the compressed air also allowed to flow through the holes 48 in the plunger 46 into the parison.

I claim:

1. In a machine of the type hereinbefore referred to for the manufacture of glass bottles, jars and the like, a pillar, an intermittently rotatable sleeve on the said pillar, a plurality of bearings on the upper end of the said sleeve, a turnover-bracket mounted in each of the said bearings, a parison mold, a neck mold and a parison mold operating piston on the fore end of each of the said brackets and a combined vacuum and compressed air inlet valve centrally located above the said pillar and sleeve, the said valve comprising a stationary plug connected with a vacuum and a compressed air source and a casing, intermittently rotatably mounted on the said plug and receiving externally the rear end of the pivots of the said turnover-brackets, longitudinal passages in each of the said pivots for separately conveying from the said plug, vacuum to the said neck mold and compressed air to both the said neck mold and the said parison mold operating piston, for the purpose hereinbefore specified.

2. In a machine of the type hereinbefore referred to for the manufacture of glass bottles, jars and the like, a pillar, an intermittently rotatable sleeve on the said pillar, a plurality of bearings on the upper end of the said sleeve, a turnover-bracket mounted in each of the said bearings, a parison mold, a neck mold and a parison mold operating piston on the fore end of each of the said brackets and a combined vacuum and compressed air inlet valve centrally located above the said pillar and sleeve, a stationary valve plug centrally located above the said pillar, having a vacuum and a compressed air compartment, a valve casing intermittently rotatably mounted on the said plug and receiving externally the rear ends of the pivots of the said turnover-brackets, a vacuum and a compressed air passage formed longitudinally in each of the said pivots, the rear end of the said compressed air passage being in constant communication with the said vacuum compartment and the rear end of the said vacuum passage in intermittent communication with the said vacuum compartment and means connecting the fore end of the said vacuum passage with the nozzle of the said neck mold and the fore end of the said compressed air passage with the said nozzle and the parison mold operating piston, for the purpose hereinbefore specified.

3. In a machine of the type hereinbefore referred to for the manufacture of glass bottles, jars and the like, a pillar, an intermittently rotatable sleeve on the said pillar, a plurality of bearings carried by the upper end of the said sleeve, a turnover-bracket mounted in each of the said bearings, a parison mold, a neck mold and a parison mold operating piston on the fore end of each of the said brackets, a stationary valve plug centrally located above the said pillar, having a vacuum and a compressed air compartment and each thereof a port, a valve casing intermittently rotatably mounted on the said plug, receiving externally the rear ends of the pivots of the said turnover-brackets and having internally an annular vacuum and an annular compressed air recess in constant register with the said plug ports and a port leading from the said annular vacuum recess to the periphery of the rear end of the said pivot, a vacuum and a compressed air passage formed longitudinally in the said pivot, the rear end of the said compressed air passage being in constant register with the said compressed air recess and the rear end of the said vacuum passage communicating with a cross port in the said pivot, adapted to be intermittently brought into register with the port in the said casing, for the purpose hereinbefore specified.

4. In a machine of the type hereinbefore referred to for the manufacture of glass bottles, jars and the like, a pillar, an intermittently rotatable sleeve on the said pillar, a plurality of bearings on the upper end of the said sleeve, a turnover-bracket mounted in each of the said bearings, a parison mold, a neck mold and a parison mold operating piston on the fore end of each of the said brackets and a combined vacuum and compressed air inlet valve centrally located above the said pillar and sleeve, the said valve comprising a stationary plug having a vacuum and a compressed air compartment and a valve casing intermittently rotatably mounted on the said plug and receiving externally the rear ends of the pivots of the said turnover-brackets, a vacuum and a compressed air passage formed longitudinally in each of the said pivots, the rear end of the said compressed air passage being in constant communication with the said compressed air compartment and the rear end of the said vacuum passage in intermittent communication with the said vacuum compartment, a cross port in the said pivot at the fore end of each of the said passages, a pipe connecting one of the said cross ports with the nozzle of the said neck mold, a chamber in the head of the said turnover-bracket, a pipe connecting the other of the said cross ports with the said chamber and two pipes connected with the said chamber one of which has a hand controlled valve and leads to the said parison mold operating piston, for the purpose hereinbefore specified.

5. In a machine of the type hereinbefore referred to for the manufacture of glass bottles, jars and the like, a pillar, an intermittently rotatable sleeve on the said pillar, a plurality of turnover-bracket bearings on the upper end of and rotatable with the said sleeve, a combined vacuum and compressed air inlet valve located centrally above the said sleeve the casing of which has externally bosses which receive the rear ends of the turnover-bracket pivots and an air tight joint located between each rear end of the said pivots and the said bosses, the said joint comprising two necks formed around the said rear ends, two annular grooves in the said boss and a metal ring cast around each of the said necks through cross apertures in the said boss, for the purpose hereinbefore specified.

Signed at Manchester, England, this 15th day of March, 1916.

JAMES HENDERSON STEELE.

Witnesses:
  ALFRED BOSSHARDT,
  STANLEY E. BRAMALL.